United States Patent [19]
Erlandson

[11] 3,782,070
[45] Jan. 1, 1974

[54] MACHINE FOR OVERWRAPPING MULTIPLE CONTAINERS
[75] Inventor: Howard W. Erlandson, Green Bay, Wis.
[73] Assignee: FMC Corporation, San Jose, Calif.
[22] Filed: Aug. 4, 1971
[21] Appl. No.: 168,927

[52] U.S. Cl. .................................... 53/184, 83/326
[51] Int. Cl. .......................................... B65b 53/02
[58] Field of Search .................. 53/28, 30, 48, 179, 53/180, 182, 184; 83/16, 171, 326, 37, 38, 321; 156/251, 269, 510, 515

[56] References Cited
UNITED STATES PATENTS

| 3,381,443 | 5/1968 | Copping | 53/30 |
| 3,417,540 | 12/1968 | Copping et al. | 53/48 |
| 3,237,371 | 3/1966 | Gerlach | 53/182 |
| 3,453,801 | 7/1969 | Stohlquist | 53/182 |
| 3,239,991 | 3/1966 | Copping | 53/48 X |
| 3,572,004 | 3/1971 | Carmichael | 53/48 |

Primary Examiner—Robert L. Spruill
Attorney—F. W. Anderson et al.

[57] ABSTRACT

A plurality of rigid containers or articles are grouped into a unit for overwrapping in thermoplastic, heat shrinkable film. The unit is inserted in a moving tube of the film which is subsequently rendered taut by directing streams of heated air on the film. As a result, the film tightens around the groups of articles and those portions of the tube at each end of the articles become constricted or necked down to retain the articles against longitudinal movement relative to the film tube. While still moving, each group of articles then encounters an orbiting hot wire for perpendicularly severing the tube at its constricted portion. After the severing of the tube, the overwrapped articles pass through a heat tunnel which further shrinks the film so that the film beomes tightly stretched and all portions thereof, including the severed free ends, closely conform to the overall shape of each group of articles.

4 Claims, 7 Drawing Figures

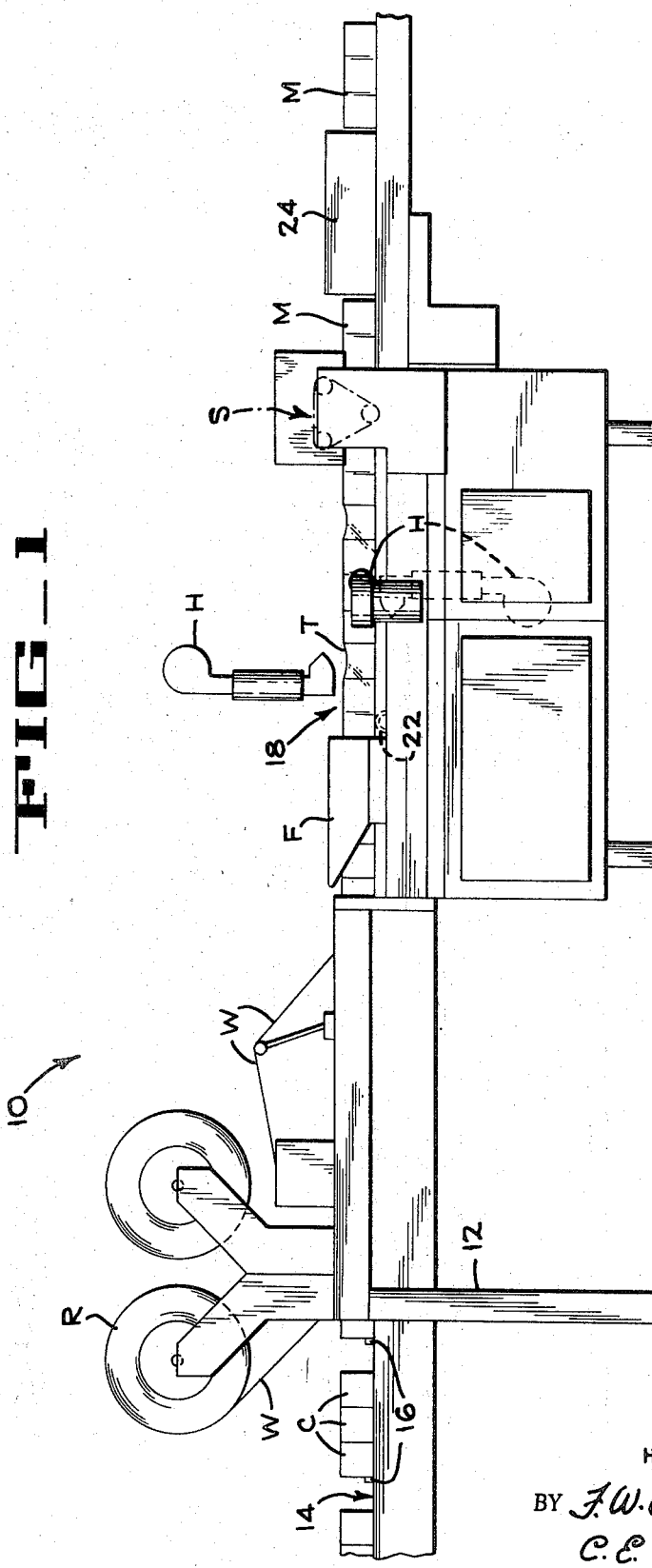

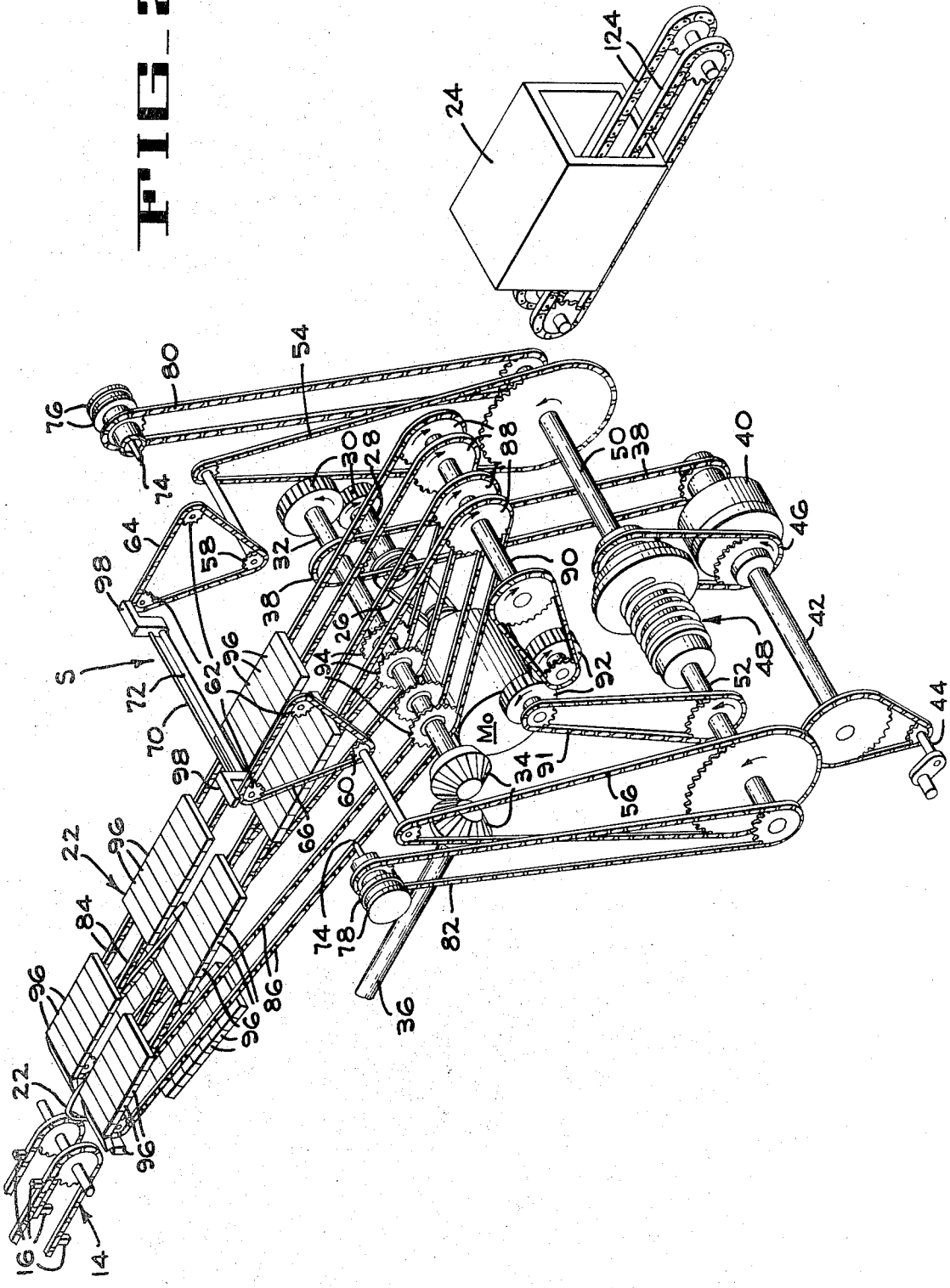
FIG_2

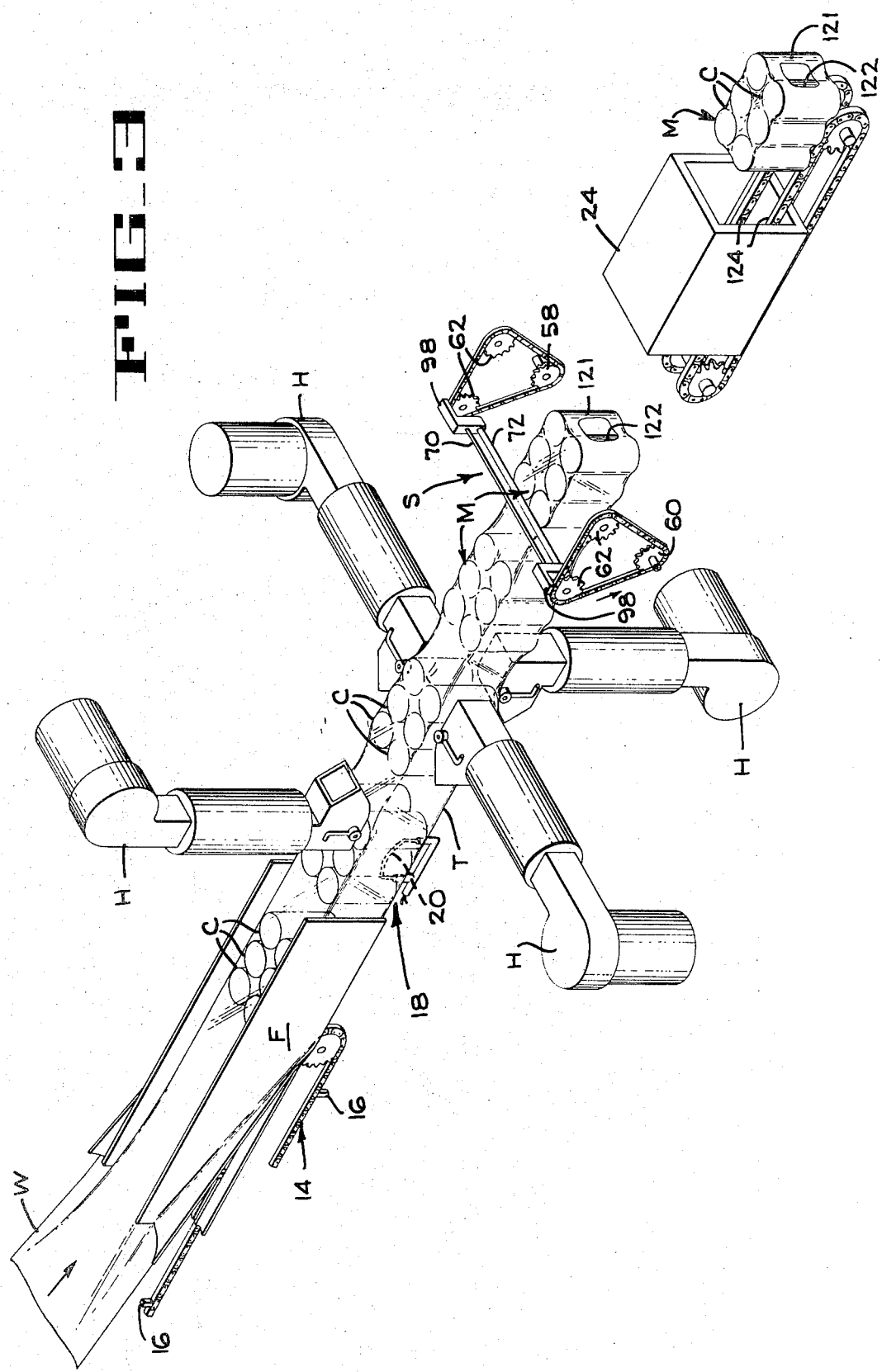

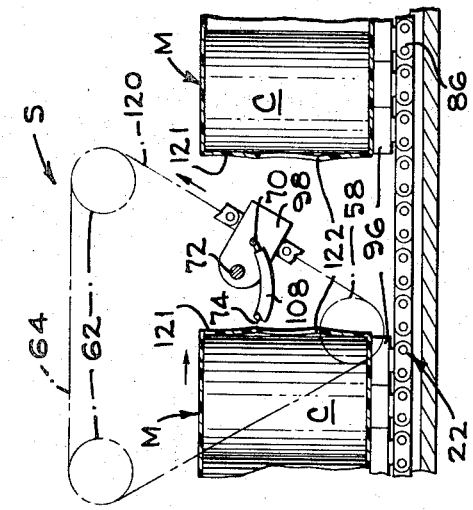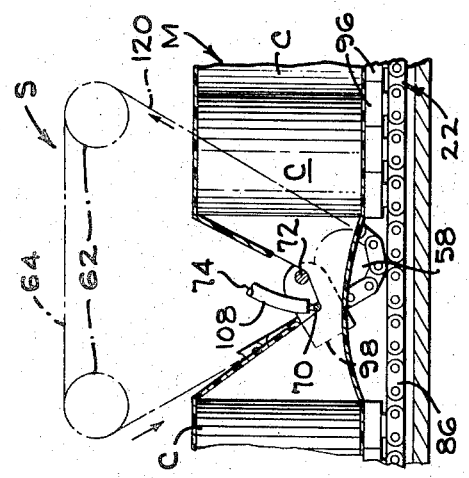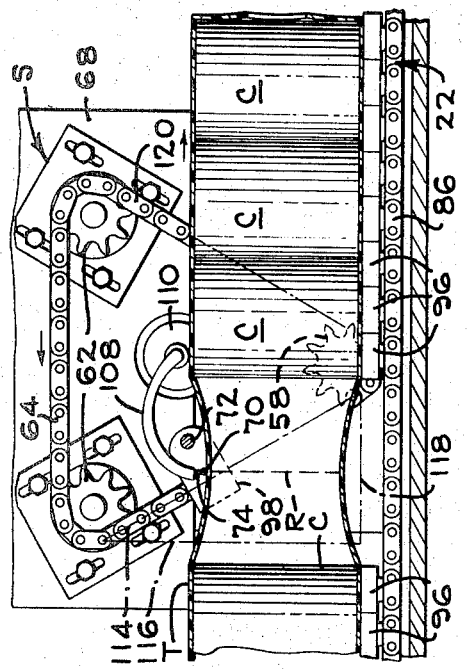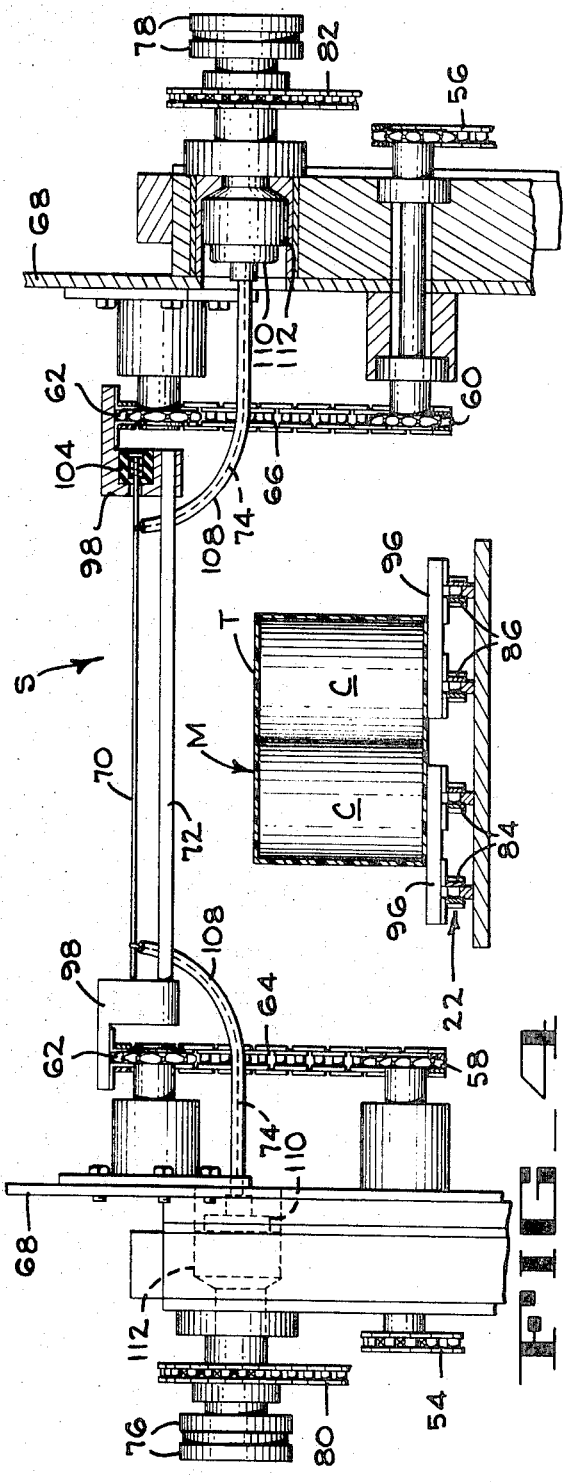

MACHINE FOR OVERWRAPPING MULTIPLE CONTAINERS

BACKGROUND OF THE INVENTION

Food and beverages, usually packaged in bottles or cans, are often merchandized in groups containing two or more items in a cardboard carrier which confines the items so that they maintain a selected arrangement. The carriers are usually formed with cutouts and tabs or lugs to maintain the arranged order of the items, and are printed to identify and create appeal for the product. Thus, carriers of this type require printing of the rolled parent cardboard stock, die cutting and creasing, and packaging for shipment to bottling or canning facilities. Further, the carriers conceal most of the contents, require setup machinery, and often need another machine to thereafter close and adhesively seal the carriers.

There are other varieties of carriers designed with the object of maintaining the cans or bottles in an assembled group by engaging the tops of the articles by a sheet of thermoformed, semi-rigid plastic. The obvious advantage of this type of carrier is that it protects the opening end of the containers, is inexpensive to make, and the merchandising data, artwork and trademark on each individual item is visible, therefore obviating the need of printing the carrier itself. Other types of carriers consist of a sheet of semi-rigid plastic with a series of punched holes which is forcibly fitted onto the sides of the upper ends of the containers. These and similar types of carriers have the distinct disadvantage that the bottoms of the containers are loose and free to move, thus increasing the risks of breakage or damage.

SUMMARY OF THE INVENTION

Interspaced groups of articles, such as cans, are continuously conveyed with a heat-shrinkable transparent film web through a web former and over a longitudinal seam sealer to form the web into a continuous tube around the articles. Heaters, which force heated air blasts against the sides, top and bottom of the tube downstream of the web former and the seam sealer, then effect a preshrinking of the tube so that it is necked down or constricted between groups of the articles in order to lock the articles in place and to make the web tube taut for a hot wire cutoff operation between the article groups.

By providing structure for moving the hot wire cutoff or severing mechanism in a diagonal path normal to the direction of movement of the entubed articles, there is no relative motion between the severing mechanism and tube, whereby the severing mechanism descends in a vertical path relative to the tube. Accordingly, the length of the tube between groups of articles is very short so that no waste or excess web results, even though the overwrap operation is carried out with the articles moving with continuous straight-line motion at a relatively high constant velocity.

BRIEF DESCRIPTION OF THE DRAWINGS

FIG. 1 is a diagrammatic side elevation of the wrapping machine of the present invention.

FIG. 2 is an exploded diagrammatic isometric view of the major components of the FIG. 1 wrapping machine.

FIG. 3 is a diagrammatic isometric view, generally similar to FIG. 2, but including the operating functions performed in producing a package unit comprising a group of articles enveloped in a heat-shrunk plastic web.

FIG. 4 is an enlarged diagrammatic transverse section.

FIGS. 5–7 are diagrammatic operational views illustrating successive stages of operation of a hot wire cutoff mechanism for severing the tubular web between adjacent groups of articles.

DESCRIPTION OF THE PREFERRED EMBODIMENT

The wrapping machine 10 (FIG. 1) of the present invention includes a floor-supported frame structure 12 and operates as briefly outlined below. The basic machine is a known type of wrapping machine, other variations of which may be found in U.S. Pat. Nos. 2,682,331, 2,762,178 and 3,009,298 wherein each machine is modified for a particular purpose. In the present invention, the wrapping machine 10 is provided with an input or receiving conveyor 14 having two laterally aligned lanes of pusher lugs 16. Each lug propels three containers C which with the laterally adjacent containers comprise the contents of a multipack M.

A web W from an overhead roll R of thermoplastic, heat-shrinkable web material is drawn through a web former F wherein the edge portions of the web are curled downward over the two adjacent lanes of containers to form a tube T with the edges in overlapping relation along the centerline at the bottom of the tube. Immediately downstream of the web former F, at a sealing station 18, the overlapping edges are bonded together by a sealing bar 20 (FIG. 3), and the entubed containers are deposited in timed relation upon a continuously moving main conveyor 22. The tube T now envelops and is sealed around the spaced container groups, and the weight of the containers prevents relative longitudinal motion between the tube, the conveyor and the container groups. It should be noted that an overlapping seal is not an essential requirement; the tube may also be formed with downturned lower edges forming abutting flanges sealed together in the conventional manner known in the art as a fin seal.

Adjacent heaters H direct continuous blasts of heated air against each side of the tube T to effect a preliminary shrinking of the web and draw the web taut. Thus, the tube T is caused to tightly grip the containers, and in the open space between groups of containers the tube becomes constricted or necked-down, and taut. The heaters are commercially available, electrically energized units, and each includes a heat control, not shown, plus a centrifugal blower and a drive motor.

Near the downstream heaters H, the entubed containers pass under a cutoff or severing mechanism S which severs the moving tube T along a vertical plane precisely at mid point between the container groups. The cutoff mechanism S comprises a particularly important feature of the present invention, as later described, because it allows continuous, relatively high speed movement of the web tube T while severing the tube perpendicularly relative to its length to form the individual multipacks M.

At the discharge end of the main conveyor 22, the multipacks M may be deposited upon another conveyor, a gravity chute, or hand conveyed to a heating tunnel 24. The heating tunnel is a commercially available unit having built-in conveying means for moving the multipacks through a controllably heated environment and effecting the final shrinking of the film wrapper covering each multipack. After traversing the heating tunnel, the wrapper is tightly shrunk over the containers, and the severed ends of the wrapper lie completely flat, with the apertures which were formerly the open ends of the tube now much smaller than the ends of the multipacks. Thus, each multipack M when wrapped in the above described manner, has a tightly shrunk transparent wrapper which reveals the contents, holds the contents in rigid alignment, and in all respects makes each multipack M a unitary package which can be formed at high production speeds and at low cost.

With more specific reference to the wrapping machine 10, FIG. 2 illustrates the major drive components, power for which is provided by a motor $M_o$. A "V" belt and pulley drive unit 26 couples the motor to a shaft 28 which, through meshed gears 30, powers a main drive shaft 32. Bevel gears at 34 on one end of the drive shaft 32 power an auxiliary driveshaft 36 that is connected, by means not shown, to the input conveyor 14 for driving the conveyor and the pusher lugs 16 in timed relation to the other operating components of the wrapping machine.

The main drive shaft 32 is also provided with a chain and sprocket drive connection 38 to a planetary transmission 40 having a control shaft 42 and a hand crank control 44 for adjusting the timing of the hot wire severing mechanism to proper position in relation to midpoint between container groups. This can be adjusted while machine is running. A drive train 46 powers a knock out clutch 48 which in the event of a malfunction in the machine will uncouple the driving power from a pair of clutch shafts 50 and 52, and also stop the motor M by means of a clutch switch, not shown. For driving the overhead tube severing mechanism S, the clutch shafts 50 and 52 are provided with chain and sprocket drive connections 54 and 56, respectively, which rotate coaxial drive sprockets 58 and 60 of the severing mechanism S. Each of the latter drive sprockets is associated with two idler sprockets 62, and a triangular chain loop 64 or 66. A fixed mounting plate 68 (FIG. 4) carries each group of sprockets.

For severing the tube T between groups of articles entubed therein, the severing mechanism S includes a hot wire cutoff or severing element 70 (FIG. 2) and a tie bar 72 that extends between the chain loops 64 and 66 for movement in a triangular path. The severing element is formed of a tensioned, electrically energized nichrome wire, the mounting for which is later described. Because the cutoff unit is continuously orbited by its supporting chain loops, the electrical connecting wires 74 (FIGS. 2 and 4) to each end of the wire 70 are rotated to prevent their being twisted. For this purpose, the wires 74 are respectively connected to slip rings 76 and 78 that are rotated by chain and sprocket drive connections 80 and 82 from the clutch shafts 50 and 52. The slip rings are engaged by conventional brushes, not shown, for conducting electrical energy to the wire 70.

The main conveyor 22 includes two side by side pairs of conveying chains 84 and 86 trained over drive sprockets 88 on a conveyor driveshaft 90. Power for the shaft 90 is provided from the clutch shaft 52 by a drive train 91 which includes meshed reversing gears at 92 to obtain the proper rotation. In order to clear the main driveshaft 32, the lower flights of the chains 84 and 86 are trained under freely rotatable idler sprockets 94 on the main driveshaft.

The air blast from the lowermost heater H (FIG. 3) must impinge the bottom of the tube T for proper operation during heat-shrinking of the tube. To provide a minimally obstructed heat path, the support surface for the entubed containers comprises two laterally spaced flights of support slats 96, and no slats are used between the container groups. For complete severance of the film tube T, the wire 70 of the tube severing mechanism S must, of course, pass below the bottom plane of the tube. Thus, omitting the conveyor support slats 96 between groups of containers also provides clearance space for the wire.

FIG. 3 covers substantially the same area of the wrapping machine as FIG. 2, except that the web former F is included because the components are not in exploded relation. With reference to FIGS. 3 and 4, the tube severing mechanism S includes two L-shaped brackets 98 secured to the chain loops 64 and 66, and interconnected by the tie bar 72. The electrically heated nichrome wire 70 for severing the tube T is carried by the brackets 98. Thus, each bracket is provided with a recess mounting a cup-shaped insulator 104 coaxial with a clearance hole in the bracket.

The ends of the wire 70 extend through each clearance hole, through a compression spring mounted in the recess, and are fixed to washers which slightly compress the springs to tension the wire 70 and maintain it straight and taut, regardless of thermal expansion. Each of the electrical conductors 74 is bonded to the wire 70 and extends through an insulator sleeve 108 to an electrical plug 110. Receptacles 112 for the plugs are respectively rotated by the drive connections 80 and 82 once for each orbit of the wire 70 to prevent twisting off the electrical conductors 74.

When the motor M (FIG. 2) is energized and the wrapping machine 10 is placed in operation, the groups of containers C are continuously conveyed at a linear velocity corresponding to a production rate of 100 to 120 multipacks M per minute. At the present time, the production speed is limited to this approximate rate by the available heat shrinkable wrapping films, not by the disclosed structural components of the present invention. Thus, it is a particular feature of the present invention that the severing mechanism S is capable of effecting vertical severance of the tube T at production rates exceeding those presently achieved, as improved wrapping films become available.

The severing mechanism S (FIGS. 5–7) advances the heated nichrome wire 70 in a path diagonally downward across the tube T, and at a velocity such that the tube T (FIG. 5) is severed along a vertical reference line R exactly midway between adjacent groups of containers C. In the present embodiment, the stated result is effected as follows:

Each group of the container support slats 96 have an aggregate length along the conveying path of 12 inches, and four slats are omitted between groups of slats. Thus, the center to center spacing of the groups of containers is 12 inches and the pusher lugs 16 (FIG. 1) on the inlet conveyor 14 are spaced 12 inches apart and timed to longitudinally center each group of containers relative to its support slats. It should be noted that it is permissible for the container groups to slightly overhang the support slats or lie slightly within the edges of the trailing and leading slats, thus enabling the severing mechanism S to handle a range of different diameter containers, as well as taller or shorter containers, without any structural changes.

The chain loops 64 and 66 of the severing mechanism S form equilateral triangles wherein a pitch line 114 (FIG. 5) of the descending flight of the chain loop 66, in conjunction with an imaginary vertical line 116, and a horizontal line 118 coincident with the support surfaces of the conveyor slats 96, define a 30°-60°-90° triangle. Thus, the pitch line 114 is twice the length of the base line 118, and the linear velocity of the chain loops 64 and 66 is about 2.23 times faster than the velocity of the main conveyor chains 84 and 86. With this arrangement, once the initial timing of the chain loops has been set so that the wire 70 first contacts the tube T at the reference line R, the horizontal component of movement of the wire 70 exactly matches the movement of the tube T, and the heated wire severs the moving tube along the reference line R, and exactly between all succeeding groups of containers.

In order to index the wire 70 with each open gap in the tube T, the length of each chain loop 64 and 66 (using only one hot wire) must be twice the distance between severing operations, or twenty four inches. It is believed evident that more than one severing wire can be used in some installations, that the disclosed velocities, geometry and drive ratios are merely exemplary, and that similar structural arrangements can be employed to assure vertical movement of the wire 70 relative to the tube T.

After severing the tube T (FIG. 6), the wire 70 passes below the conveying surface through the gap between the conveyor slats 96, and then travels an ascending flight 120. Since the geometry of the flight 120 relative to the conveying surface is the reverse of the flight 114, the wire 70 retains its centered relation between the moving container groups and exits without further contact with the tube T for the next severing operation in centered relation between the trailing containers of one container group, and the leading containers of the succeeding container group.

Residual heat and the tension in the severed tube T (FIG. 6) causes the film to draw toward the ends of the container groups as it is severed so that upon the completion of the severing operation, as shown in FIG. 7, the apertured ends of the tube at 121 lie relatively flat and the apertures 122 are small in relation to the area covered by the adjacent web material to firmly lock the containers C in place. In order to complete the shrinking of the tube so that all sides thereof are completely taut and conform very close to the shape of the contents, each multipack M is fed into the heat tunnel 24 (FIG. 3) and is transported therethrough by conveying chains 124 for heat treatment compatible with the specific film being used and insufficient to damage the product in the containers.

Each multipack M formed as outlined above has several advantages over the previously mentioned prior art packages. An important advantage is that no external printing is required when transparent films are used, because the containers are clearly visible. Further, the wrapping affords complete protection for the tops of the containers so that the multipacks can be subjected to all of the usual and numerous handling procedures before reaching the consumers table, and yet the containers will be substantially as clean as when they left the production line. The cost advantage is significant, due to the high production rates attainable with the continuous motion mode of operation, the simplicity of the overall machine, the relatively low cost of heat shrinkable web materials, and the elimination of external printing to identify the contents. In regard to high production rates, it is evident that the structure which enables continuous straight line motion of the multipacks, namely, the severing element S which includes the orbiting hot wire 70, forms a basic and highly important aspect of the present invention.

The two-stage heat shrinking operation is also important because the tube T is constricted between groups of containers immediately after the tube is formed and sealed, thus locking the containers in place and maintaining the spacing of the container groups for the tube severing operation. Because of the operating mode of the severing mechanism S, continuous conveying movement for high speed production output is attained in a relatively simple and durable machine which is readily adaptable to handle different sizes and types of containers for multipack wrapping.

Although the best mode contemplated for carrying out the present invention has been herein shown and described, it will be apparent that modification and variation may be made without departing from what is regarded to be the subject matter of the invention.

What is claimed is:

1. A multipack overwrapping machine comprising means for conveying a group of articles along a predetermined path, means for entubing the moving group of articles in a heat shrinkable film web, means for directing a hot air blast against the tube for effecting partial shrinkage and constriction of the tube at opposed ends of the group of articles to lock the articles in place within the tube, means for severing the constricted portions of the moving tube to provide an individual multipack, and means for heating each multipack to complete the shrinkage of the tube so that the tube conforms closely to the shape of the articles therein, said severing means including an endless flexible loop element at each side of said conveying means, each of said loop elements including a declining linear flight extending downward across and beyond said conveying path and an inclining linear flight extending upward across said conveying path, a resistance heating wire carried by said loop elements, and means for concurrently driving said loop elements at a velocity producing a forward component of movement, for each of said flights, that causes said resistance wire to remain in vertical alignment with a predetermined moving point on said conveying means.

2. Apparatus according to claim 1 and electrical junction means substantially in the plane of each of said loop elements and substantially equidistant from the orbital path followed by the adjacent end of said resistance wire, an electrical conductor connected between each of said junction means and said resistance wire, and means for rotating both of said junction means once per orbit of said resistance wire.

3. Apparatus according to claim 2 and a slip ring rotatable with each of said junction means and electrically connected thereto for conducting electrical energy to said resistance wire.

4. Apparatus according to claim 3 and resilient mounting means for said resistance wire intermediate each end portion of said wire and said flexible loop elements to tension the wire and maintain it linear regardless of thermal expansion.

* * * * *